(12) United States Patent
Miyake et al.

(10) Patent No.: US 11,329,594 B2
(45) Date of Patent: May 10, 2022

(54) APPARATUS AND CONTROL METHOD FOR REDUCING LEAKAGE CURRENT AND NOISE

(71) Applicant: Samsung Electronics Co., Ltd., Suwon-si (KR)

(72) Inventors: Hiroyuki Miyake, Yokohama (JP); Kosaku Adachi, Yokohama (JP); Yoji Imahori, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 17/034,641

(22) Filed: Sep. 28, 2020

(65) Prior Publication Data

US 2021/0111658 A1 Apr. 15, 2021

(30) Foreign Application Priority Data

Oct. 10, 2019 (JP) ............................ JP2019-186756
Jun. 12, 2020 (KR) ........................ 10-2020-0071573

(51) Int. Cl.
*H02P 27/08* (2006.01)
*H02M 1/12* (2006.01)
*H02M 7/5395* (2006.01)

(52) U.S. Cl.
CPC ............ *H02P 27/085* (2013.01); *H02M 1/12* (2013.01); *H02M 7/5395* (2013.01)

(58) Field of Classification Search
CPC ..... H02P 27/085; H02M 1/12; H02M 7/5395; H02M 1/123; H02M 1/38
See application file for complete search history.

(56) References Cited

U.S. PATENT DOCUMENTS

| | | | |
|---|---|---|---|
| 9,312,780 B2* | 4/2016 | Taguchi | H02M 5/458 |
| 2013/0036759 A1* | 2/2013 | Harada | H02P 27/08 62/259.2 |
| 2013/0181646 A1* | 7/2013 | Takata | H02M 7/219 318/400.29 |
| 2013/0293047 A1* | 11/2013 | Nagasaka | H02M 1/44 310/72 |
| 2017/0058898 A1* | 3/2017 | Kawamura | F04C 18/0215 |
| 2018/0278176 A1* | 9/2018 | Ogasawara | H02P 27/08 |

FOREIGN PATENT DOCUMENTS

| | | |
|---|---|---|
| JP | 2006-238573 A | 9/2006 |
| JP | 4492371 B2 | 6/2010 |
| JP | 4873317 B2 | 2/2012 |
| JP | 5811438 B2 | 11/2015 |

* cited by examiner

*Primary Examiner* — Rina I Duda
(74) *Attorney, Agent, or Firm* — Jefferson IP Law, LLP

(57) ABSTRACT

An apparatus that reduces leakage current and noise in various environments. The apparatus includes a motor, an inverter to supply power to the motor and a plurality of switching elements configured to convert input DC power into three-phase AC power, and a processor to control the plurality of switching elements. The processor generates a carrier, obtains a rising and falling edge timing of a PWM control signal of each phase based on superposition of a zero phase voltage, and drives a motor by shifting the PWM control signal of each phase to allow a rising edge timing and a falling edge timing of a PWM control signal of one phase among the PWM control signal of the each phase to be different from a rising edge timing and a falling edge timing of a PWM control signal of other phase among the PWM control signal of the each phase.

20 Claims, 17 Drawing Sheets

FIG.4B

LINE VOLTAGE ACCORDING 415
TO ONE CYCLE OF CARRIER

| LINE | VOLTAGE |
|---|---|
| Max -> Mid | 2A |
| Max -> Min | 2A+2B |
| Mid -> Min | 2B |

⇒

LINE VOLTAGE ACCORDING 425
TO ONE CYCLE OF CARRIER

| LINE | VOLTAGE |
|---|---|
| Max -> Mid | C-D |
| Max -> Min | 2C-D-E |
| Mid -> Min | C-E |

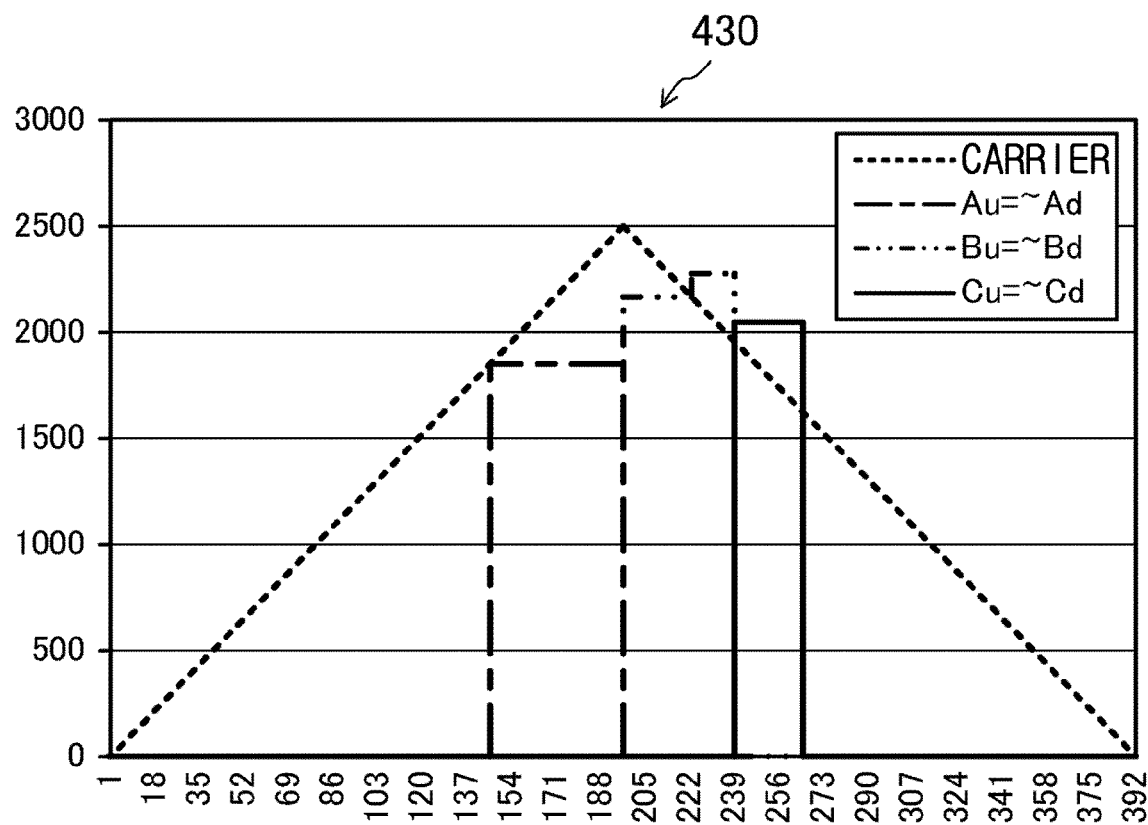

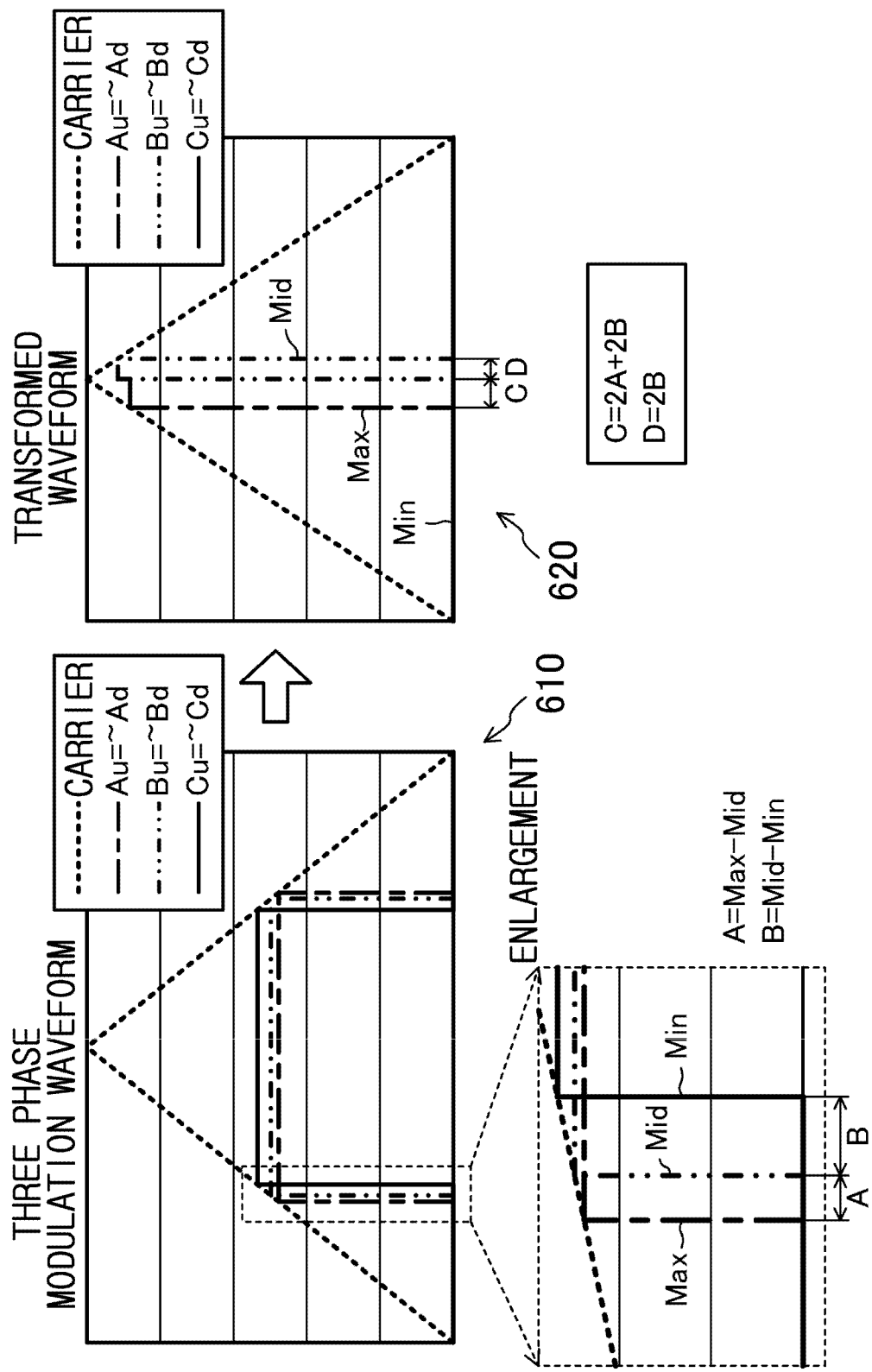

LINE VOLTAGE ACCORDING TO ONE CYCLE OF CARRIER 615

| LINE | VOLTAGE |
|---|---|
| Max -> Mid | 2A |
| Max -> Min | 2A+2B |
| Mid -> Min | 2B |

LINE VOLTAGE ACCORDING TO ONE CYCLE OF CARRIER 625

| LINE | VOLTAGE |
|---|---|
| Max -> Mid | C-D=2A |
| Max -> Min | C=2A+2B |
| Mid -> Min | D=2B |

APPARATUS AND CONTROL METHOD FOR REDUCING LEAKAGE CURRENT AND NOISE

CROSS-REFERENCE TO RELATED APPLICATION(S)

This application is based on and claims priority under 35 U.S.C. § 119(a) of a Japanese patent application number 2019-186756, filed on Oct. 10, 2019, in the Japanese Patent Office, and of a Korean patent application number 10-2020-0071573, filed on Jun. 12, 2020, in the Korean Intellectual Property Office, the disclosure of each of which is incorporated by reference herein in its entirety.

BACKGROUND

1. Field

The disclosure relates to an inverter capable of performing inverter control through pulse width modulation (PWM) and a control method of the same.

2. Description of Related Art

Inverters have already been used in various fields, but their application range is expanding further, such as automotive fields such as electric vehicles (EV), other renewable energy fields, and distributed generation systems. As for the use of the inverter, there is a difficulty in that leakage current is generated through stray capacitance between drive target load (i.e., motor, etc.) and the ground. In the manner of the related art, a neutral point voltage of a motor is always equal to the ground by a combination of an induction motor and a commercial power supply, but when using a pulse width modulation (PWM) control inverter, a neutral point voltage always fluctuates and thus a leakage current is generated through the stray capacitance with the ground. Particularly, because the inverter generates leakage current including high-frequency components caused by a carrier frequency, it may lead to difficulties in the quality such as malfunction of electric leakage circuit breaker and electric shock. Therefore, a research on hardware or software for technology to prevent leakage current has been also actively conducted.

Patent document 1 discloses that, when a zero voltage, in which an amplitude of a modulation wave is zero, is output in the three-phase modulation, an increase in the instantaneous leakage current from the motor is suppressed by preventing superposition of on-off timing of the three-phase pulses by shifting each three phase output pulse. However, according to the neutral point potential variation, the average leakage current is still greater than that of the two-phase modulation because the neutral point potential varies from zero to the direct current (DC) input voltage (VDC).

Patent document 2 discloses that a three-phase voltage source inverter that obtains a three-phase alternating current (AC) voltage from a DC power supply has two or more types of modulation methods and thus according to a rotational speed, the three-phase voltage source inverter is converted to a modulation method that reduces a maximum value of leakage current in a low speed region, and converted to a modulation method that ensures speed stability in middle and high speed regions.

RELATED ART DOCUMENT (Patent Document 1) Japanese Patent Publication No. 4873317

(Patent Document 2) Japanese Patent Publication No. 4492371

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus capable of efficiently reducing leakage current and noise in various environments by shifting a pulse signal of an inverter configured to control a three-phase drive motor, and a control method of the same.

Additional aspects of will be set forth in part in the description which follows and, in part, will be apparent from the description, or may be learned by practice of presented embodiments.

In accordance with an aspect of the disclosure, an apparatus is provided. The apparatus includes at least one compressor configured to circulate refrigerant, wherein the at least one compressor includes at least one motor, an inverter configured to supply power to the at least one motor and a plurality of switching elements configured to convert input DC power into three-phase AC power and output the three-phase AC power, and at least one processor configured to control the plurality of switching elements. The at least one processor is configured to generate a carrier, configured to obtain a rising edge timing and a falling edge timing of a pulse width modulation (PWM) control signal of each phase based on superposition of a zero phase voltage having a predetermined magnitude and the carrier, and configured to drive a motor by shifting the PWM control signal of each phase to allow a rising edge timing and a falling edge timing of a PWM control signal of one phase among the PWM control signal of the each phase to be different from a rising edge timing and a falling edge timing of a PWM control signal of other phase among the PWM control signal of the each phase.

The at least one processor may shift the PWM control signal to allow two phases of the PWM control signal to be simultaneously turned on within one cycle of the carrier.

The at least one processor may change a pulse width of the PWM control signal to allow a magnitude of an output line voltage corresponding to the PWM control signal to be substantially the same before and after the shift.

The at least one processor may change at least one of the zero phase voltage and a shift amount of the PWM control signal to allow a period, in which the PWM control signal of a phase having a maximum magnitude-voltage command signal among three phases is turned on and the PWM control signal of other phase is turned off, to exceed a predetermined minimum period required for single shunt current sensing.

The at least one processor may change at least one of the zero phase voltage and a shift amount of the PWM control signal to allow a period, in which the PWM control signal of a phase having a minimum magnitude-voltage command signal among three phases is turned off and the PWM control signal of other phase is turned on, to exceed a predetermined minimum period required for single shunt current sensing.

The at least one processor may stop the shift at any point of time.

The at least one processor may generate a lower-side-stuck two-phase modulation signal or an upper-side-stuck two-phase modulation signal configured to pause one phase among three phases in response to the stop of the shift.

The at least one processor may shift the PWM control signal in response to the three phase AC power being less than a predetermined modulation rate.

The at least one processor may pause one phase of three phases by generating a lower-side-stuck two-phase modulation signal by controlling the plurality of switching elements, and the at least one processor may shift a PWM control signal of each phase to allow a rising edge timing and a falling edge timing of a PWM control signal of one phase among the PWM control signal corresponding to the lower-side-stuck two-phase modulation signal to be different from a rising edge timing and a falling edge timing of a PWM control signal of other phase.

The at least one processor may adjust an on-period to allow a sum of periods, in which the PWM control signal corresponding to each phase is turned on, to be substantially the same in a plurality of consecutive cycles of the carrier.

In accordance with another aspect of the disclosure, a control method of an apparatus is provided. The control method includes generating a carrier, obtaining a rising edge timing and a falling edge timing of a pulse width modulation (PWM) control signal of each phase based on superposition of a zero phase voltage having a predetermined magnitude and the carrier, converting the input direct current (DC) power into three-phase alternating current (AC) power by shifting the PWM control signal of each phase to allow the rising edge timing and the falling edge timing of a PWM control signal of one phase among the PWM control signal of the each phase to be different from the rising edge timing and the falling edge timing of a PWM control signal of other phase among the PWM control signal of the each phase, outputting the three-phase AC power and driving a motor by the three-phase AC power.

The shifting of the PWM control signal of each phase may include shifting the PWM control signal to allow two phases of the PWM control signal to be simultaneously turned on within one cycle of the carrier.

The control method may further include changing a pulse width of the PWM control signal to allow a magnitude of an output line voltage corresponding to the PWM control signal to be substantially the same before and after the shift.

The shifting of the PWM control signal of each phase may include changing at least one of the zero phase voltage and a shift amount of the PWM control signal to allow a period, in which the PWM control signal of a phase having a maximum magnitude-voltage command signal among three phases is turned on and the PWM control signal of other phase is turned off, to exceed a predetermined minimum period required for single shunt current sensing.

The shilling of the PWM control signal of each phase may include changing at least one of the zero phase voltage and a shift amount of the PWM control signal to allow a period, in which the PWM control signal of a phase having a minimum magnitude-voltage command signal among three phases is turned off and the PWM control signal of other phase is turned on, to exceed a predetermined minimum period required for single shunt current sensing.

The control method may further include stopping the shift at any point of time.

The control method may further include generating a lower-side-stuck two-phase modulation signal or an upper-side-stuck two-phase modulation signal configured to pause one phase among three phases in response to the stop of the shift.

The shilling of the PWM control signal of each phase may include shifting the PWM control signal in response to the three phase AC power being less than a predetermined modulation rate.

The shifting of the PWM control signal of each phase may include pausing one phase of three phases by generating a lower-side-stuck two-phase modulation signal by controlling the plurality of switching elements, and shifting a PWM control signal of each phase to allow a rising edge timing and a falling edge timing of a PWM control signal of one phase among the PWM control signal corresponding to the lower-side-stuck two-phase modulation signal to be different from a rising edge timing and a falling edge timing of a PWM control signal of other phase.

The control method may further include adjusting an on-period to allow a sum of periods, in which the PWM control signal corresponding to each phase is turned on, to be substantially the same in a plurality of consecutive cycles of the carrier.

The control method may further include determining a first period in which only a PWM control signal of a phase having the maximum magnitude among three phases is turned on and the PWM signal of another phase is turned off.

The control method may further include determining a second period in which only a PWM control signal of the phase having a minimum magnitude among the three phases is turned off and the PWM control signal of another phase is turned off.

The control method may further include shifting, in response to at least one of the first period and the second period being less than a single shunt current sensing period, the PWM control signal to allow the rising edge timing of the PWM control signal of one phase to be different from the falling edge timing of the PWM control signal of other phase.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4B is diagram illustrating a specification for generating a transformed waveform in which a pulse shift is performed in a three-phase modulation wave according to an embodiment of the disclosure;

FIG. 4C is diagram illustrating a specification for generating a transformed waveform in which a pulse shift is performed in a three-phase modulation wave according to an embodiment of the disclosure;

FIG. 6A is diagram illustrating a specification for generating a transformed waveform in which a pulse shift is performed in a three-phase modulation wave according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
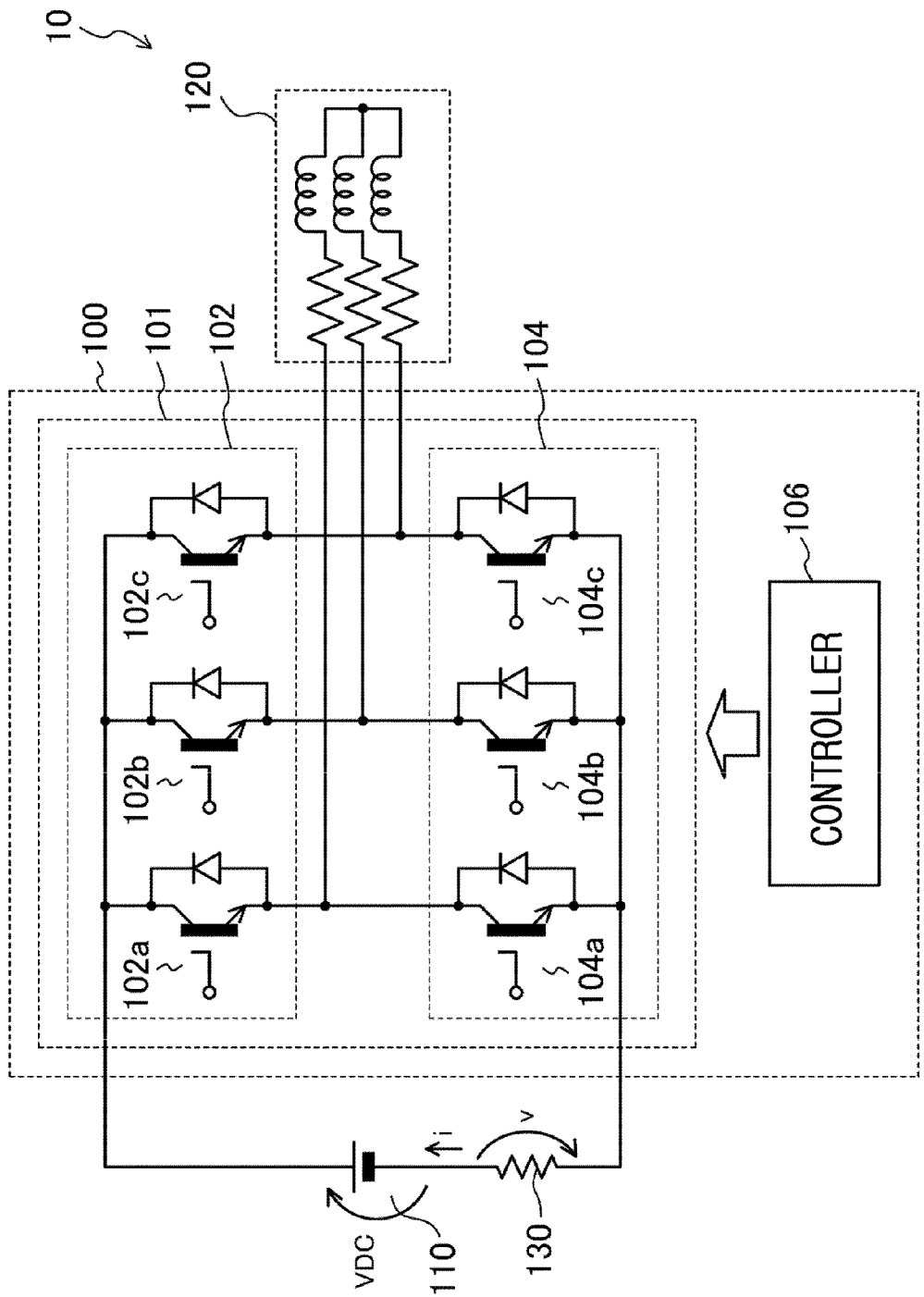
FIG. 1 is a block diagram of an electric device according to an embodiment of the disclosure.

FIG. 1 is a block diagram of an electric device according to an embodiment of the disclosure.

Referring to FIG. 1, an electric device 10 includes an inverter 100 and a load 120. According to one embodiment the device may comprise a compressor. According to an embodiment, the compressor may include a load 120 and an inverter 100. A compressor configured to circulate refrigerant. A compressor is a mechanical device that compresses a gas to increase its pressure. Such a compressor consists of a cycle in which air is sucked, compressed, and discharged according to the rotation of the rollers in the cylinder and the opening and closing of the valve. The compressor is provided with a body in the form of a closed container, a motor installed inside the body, and a cylinder assembly connected to the motor. For example, the electric device 10 may include a device including a motor such as a washing machine and a refrigerator. In this case, the load 120 corresponds to a motor, but is not limited thereto. Therefore, the load 120 may be any appropriate load. The electric device may include the an electronic device.

The inverter 100 receives DC power from the DC power supply 110 and outputs the DC power to the load 120 as three-phase AC power. The DC power supply 110 rectifies AC from AC power to generate DC power. For example, the DC power supply 110 supplies DC power to the inverter 100 by rectifying and smoothing 100 volts of AC obtained from a home power outlet.

The inverter 100 includes a main circuit 101 and a controller 106. The main circuit 101 includes an upper arm 102 and a lower arm 104. The upper arm 102 includes three switching elements 102a to 102c. The lower arm 104 includes three switching elements 104a to 104c. The switching elements 102a to 102c and 104a to 104c are connected to a three-phase bridge to convert the DC power, which is input from the DC power supply 110, into three-phase AC power and outputs the three-phase AC power to the load 120. The switching elements 102a to 102c and 104a to 104c are typically power switching elements isolated gate bipolar transistors (IGBT), but are not limited thereto. Therefore, the switching element may be an appropriate semiconductor switching element. Flywheel diodes are connected in reverse parallel in the switching elements 102a to 102c and 104a to 104c.

The controller 106 controls the power output from the main circuit 101 to the load 120 by applying an appropriate control voltage to the gates corresponding to control terminals of the switching elements 102a to 102c and 104a to 104c. For example, the controller 106 controls switching timings of the switching elements 102a to 102c and 104a to 104c according to power consumed by the load 120.

A resistor 130 having a resistance value r is a shunt resistor for measuring a current i. According to the equation $i=v/r$, it is possible to obtain the current i by using a sensor configured to measure a voltage v. As described above, current detection using only one resistor 130 is referred to as single shunt current sensing.

Figure 2:
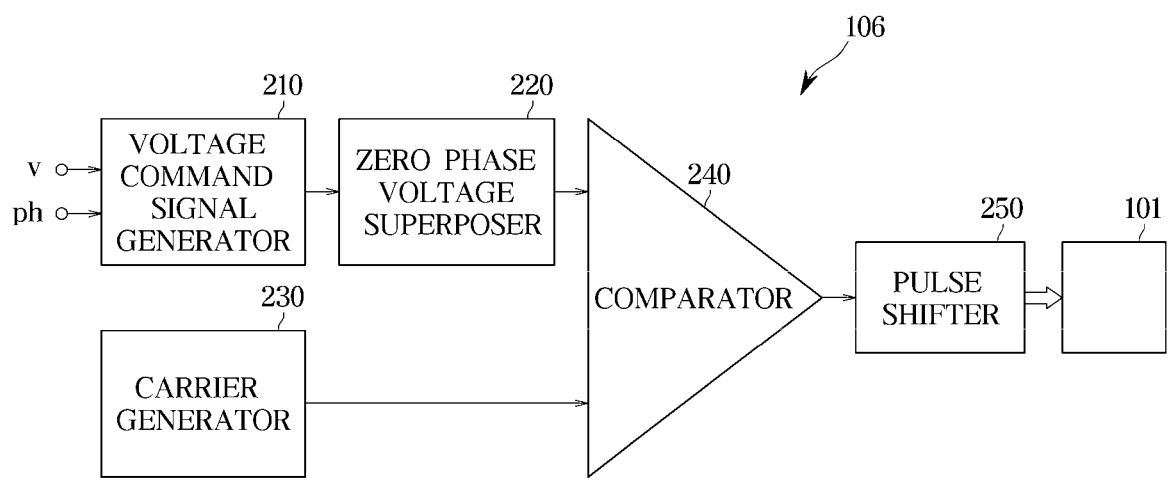
FIG. 2 is a diagram illustrating a structure of a controller according to an embodiment of the disclosure.

FIG. 2 is a diagram illustrating a structure of a controller according to an embodiment of the disclosure.

Referring to FIG. 2, signal lines drawn with one line represent three phases a U phase, a V phase, and a W phase, respectively. The controller 106 includes a voltage command signal generator 210, a zero phase voltage superposer 220, a carrier generator 230, a comparator 240, and a pulse shifter 250. The voltage command signal generator 210 receives a voltage v and a phase ph of a rotor of the motor corresponding to the load 120 as an input, and generates a three-phase voltage command signal based on the input, and outputs the three-phase voltage command signal to the zero phase voltage superposer 220.

The zero phase voltage superposer 220 superposes a zero phase voltage, which is described later, on a voltage command signal to reduce a pulse width of each phase of pulse width modulation (PWM) control signal, which is described later, to a predetermined value or less, and outputs it to the comparator 240. The carrier generator 230 generates a carrier of PWM control and outputs the carrier to the comparator 240. This carrier is a triangular wave having a frequency sufficiently higher than the voltage command signal. According to an embodiment, the carrier may be a saw tooth wave instead of a triangular wave. The comparator 240 compares a magnitude of the voltage command signal, on which the zero phase voltage is superposed, with a magnitude of the carrier, controls the main circuit 101, generates a PWM control signal for driving, and outputs the PWM control signal to the pulse shifter 250. The pulse shifter 250 shifts the received PWM control signal within one cycle of the carrier, thereby generating a signal for controlling each switching element of the main circuit 101, and outputting the signal to the main circuit 101.

According to an embodiment, the controller may perform a three-phase modulation including zero phase superposition.

According to an embodiment, the zero phase superposition and the pulse shift may be performed by using the controller 106 including the zero phase voltage superposer 220 and the pulse shifter 250.

Figure 3:
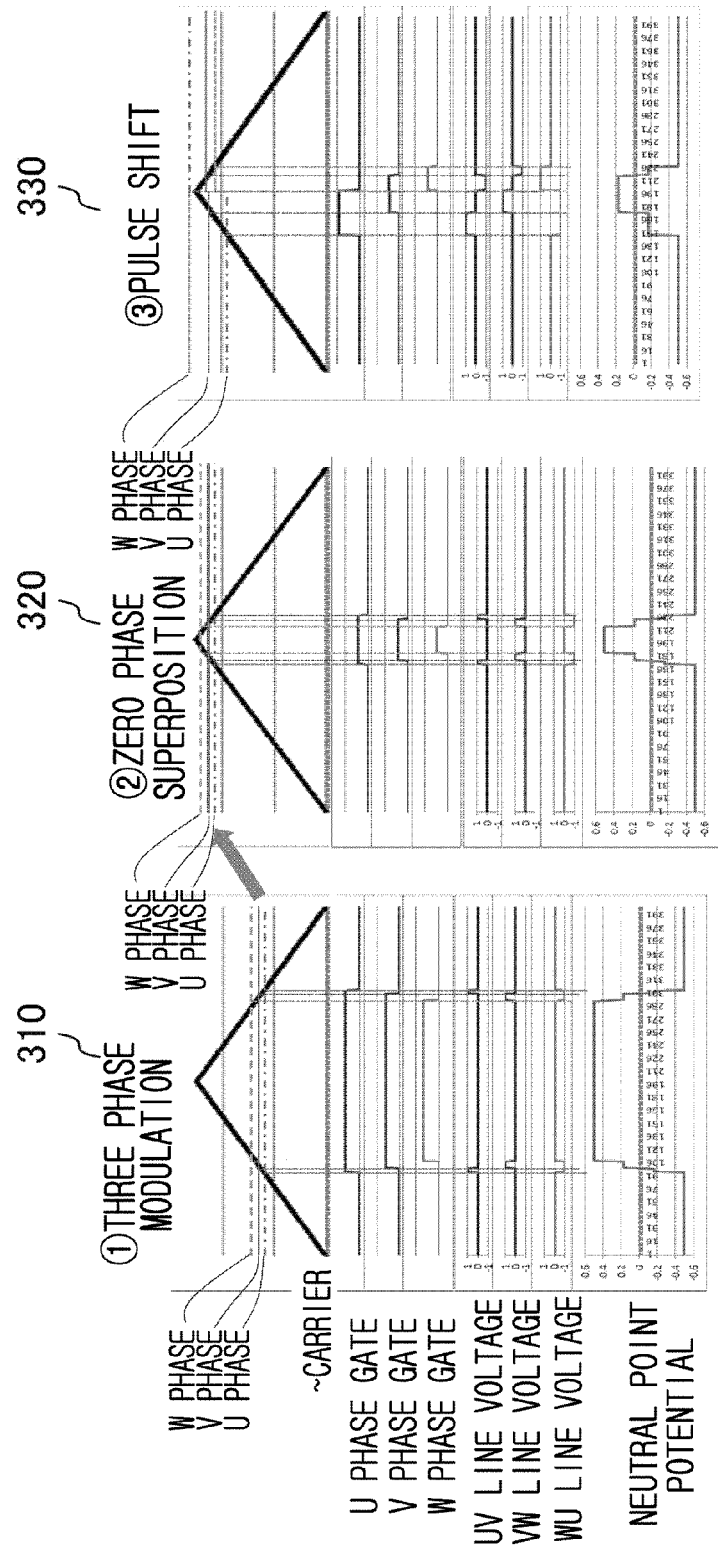
FIG. 3 is a graph illustrating a carrier, a U phase gate signal, a V phase gate signal, a W phase gate signal, a UV line voltage, a VW line voltage, a WU line voltage, and a neutral point potential according to an embodiment of the disclosure.

FIG. 3 is a graph illustrating a carrier, a U phase gate signal, a V phase gate signal, a W phase gate signal, a UV line voltage, a VW line voltage, a WU line voltage, and a neutral point potential according to an embodiment of the disclosure.

Referring to FIG. 3, a plot 310 indicates a waveform of a signal group corresponding to the voltage command signal output from the voltage command signal generator 210. A plot 320 indicates a waveform of a signal group corresponding to the voltage command signal output from the zero phase voltage superposer 220. A plot 330 indicates a waveform of a signal group corresponding to the PWM control signal output from the pulse shifter 250.

According to an embodiment, at a low-voltage output, the controller may perform suppression of a sharp change in the neutral point potential, and perform leakage current reduction (suppressing the neutral point voltage to two thirds). Particularly, the controller may obtain a minimum duty for single shunt current sensing at a low modulation rate including zero voltage. Further, FIG. 3 illustrates that a waveform is being shifted (zero vector superposition) so as to be equivalent to an average line voltage in one cycle of the carrier.

In this description, "modulation rate" refers to a ratio of an output voltage to a maximum output voltage at a predetermined time point. For example, when the modulation rate is 1.0, the output voltage at that time is equal to the maximum output voltage.

The pulse shifter 250 shifts a PWM control signal to allow a rising edge and a falling edge of any two phases, which are among three phases of the PWM control signal, to be adjacent to each other, thereby preventing the three phases of the PWM control signal from being simultaneously turning on in one cycle of the carrier. According to the embodiment shown in the plot 330, the pulse shifter 250 shifts the PWM control signal to allow two phases of the PWM signal to be simultaneously turned on in one cycle of the carrier.

According to an embodiment, by superposing the zero phase voltage on the three-phase modulation signal at the low-voltage output, a pulse width is adjusted to be reduced in a range in which a minimum on-period is obtained. A duty at the low voltage output, which is close to zero voltage before superimposing the zero phase voltage, is about 50%. Each pulse is shifted to allow a falling (or rising) edge of a pulse output of a phase having the maximum modulation rate and a rising (or falling) edge of a pulse output of a phase having the minimum modulation rate to be adjacent to each other. Therefore, it is possible to compensate the leakage current having opposite polarity, thereby reducing the leakage current caused by switching which corresponds to one phase switching apparently. Therefore, even though it is three phase modulation method, it is possible to suppress the variation of the neutral point potential to 2 Vdc/3 (Vdc: input DC voltage) like two phase modulation method. Further, because the variation interval of the neutral point potential is increased, an increase in leakage current caused by the superposition is suppressed.

$$i_L = C \cdot d/dt((v_u+v_v+v_w)/3) = C \cdot dv_c/dt \quad \text{Equation 1}$$

Meanwhile, the leakage current may be expressed by equation 1.

Referring to equation 1, the leakage current increases in proportion to an amount of change (inclination) of the neutral point potential $v_c$. In addition, rather than the pulse shift on the premise of securing the minimum on-period for single shunt current sensing, it may be applied to single shunt current sensing system (for example, a refrigerator, and an air conditioner).

Figure 4A:
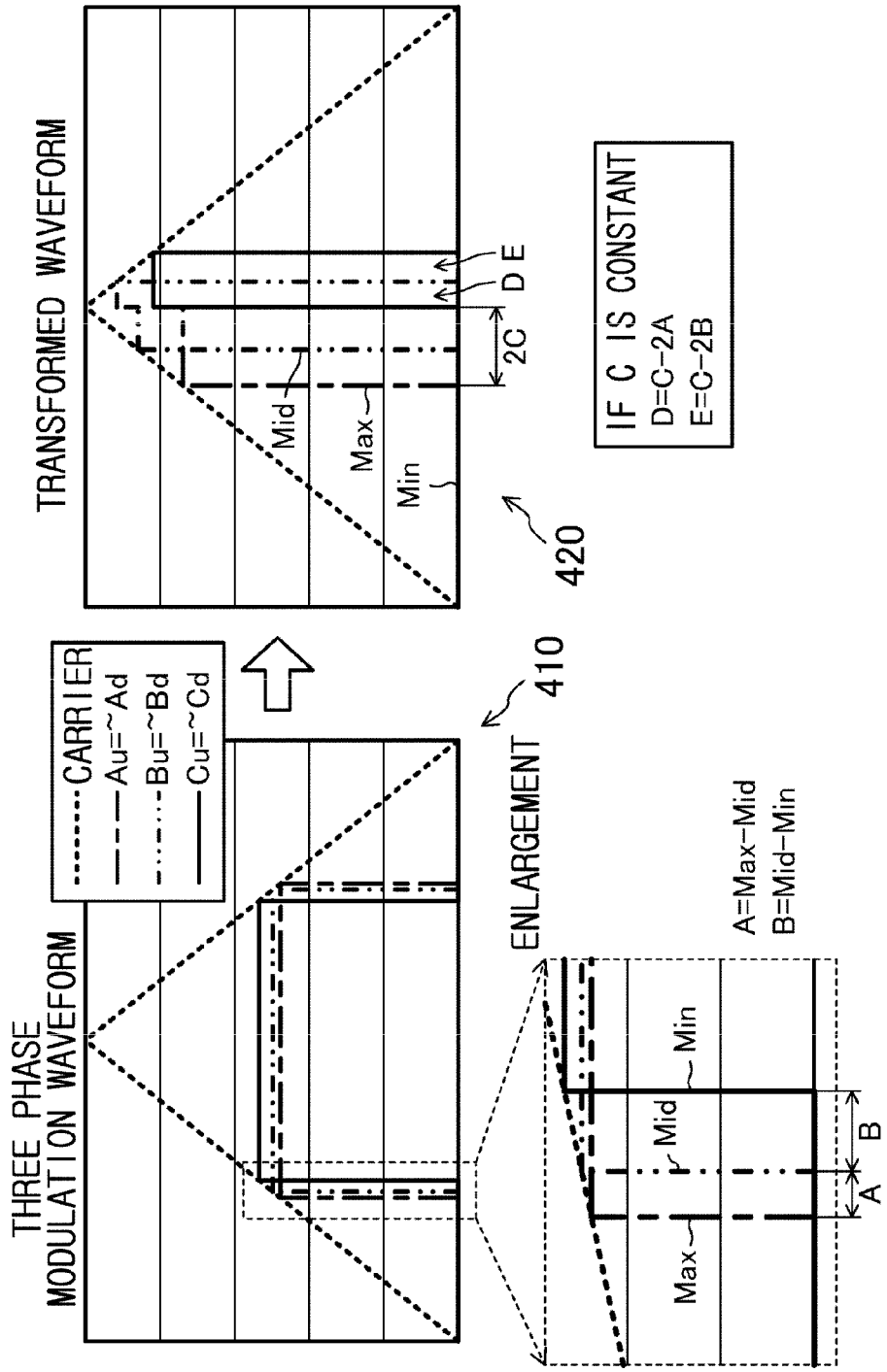
FIG. 4A is diagram illustrating a specification for generating a transformed waveform in which a pulse shift is performed in a three-phase modulation wave according to an embodiment of the disclosure.

FIGS. 4A and 4B are diagrams illustrating a specification for generating a transformed waveform in which a pulse shift is performed in a three-phase modulation wave according to various embodiments of the disclosure.

In the pulse shift, a value of the voltage command signal compared with a triangular wave carrier is adjusted by rising and falling of the triangular wave.

Referring to FIG. 4A, a vertical axis represents a voltage ranging from −Vdc/2 to +Vdc/2, and a horizontal axis represents a time corresponding to one cycle of the carrier. Referring to FIG. 4A, "Max" represents a phase (U phase), in which a magnitude of the voltage command signal is the maximum, "Mid" represents a phase (V phase), in which a magnitude of the voltage command signal is the second maximum, and "Min" represents a phase (W phase), in which a magnitude of the voltage command signal is the minimum. Referring to FIG. 4A, "Au" represents a state of an upper switching element on the U phase, "Ad" represents a state of the lower switching element on the U phase, "Bu" represents a state of the upper switching element on the V phase, "Bd" represents a state of the lower switching element on the V phase, "Cu" represents a state of the upper switching element on the W phase, and "Cd" represents a state of the lower switching element on the W phase. A horizontal portion in which the plots of Max, Mid, and Min in FIG. 4A are cut off from the carrier represents a section in which the switching elements of each phase are turned on.

FIG. 4B is a table illustrating line voltages with a period A and B of FIG. 4A according to an embodiment of the disclosure.

Referring to FIG. 4B, a line voltage Max→Mid is a voltage between the UV phases, a line voltage Max→Min is a voltage between the UW phases, and a line voltage Mid→Min is the voltage between the VW phases.

In order to prevent three phases of the PWM control signal from being simultaneously turned on in one cycle of the carrier, the pulse shifter 250 may shift a PWM control signal to allow a falling edge of a PWM control signal of the phase having the maximum magnitude-voltage command signal and a rising edge of a PWM control signal of the phase having the minimum magnitude-voltage command signal to be adjacent to each other or the pulse shifter 250 may shift a PWM control signal to allow a rising edge of the PWM control signal of the phase having the maximum magnitude-voltage command signal and a falling edge of the PWM control signal of the phase having the minimum magnitude-voltage command signal to be adjacent to each other.

That is, in order to prevent at least two phases of the PWM control signal from being turned on simultaneously in one cycle of the carrier, the controller including the pulse shifter 250 may shift PWM control signals to allow a PWM control signal of other phase to be turned on at a point of time in which a PWM control signal of one phase among the PWM control signals is turned off.

An example of this pulse shift is the conversion from a plot 410 to a plot 420.

The pulse shifter 250 adjusts a pulse width of the PWM control signal to allow an output line voltage to be the same before and after the shift (between the plot 410 and the plot 420). In order to implement this, it is required that the output line voltages according to one cycle of the carrier are the same between the plot 410 and the plot 420. The output line voltages according to one cycle of the carrier of the plot 410 and the plot 420 may be represented by relationship 415 and relationship 425, respectively. When it is assumed that C is constant, D and E may be obtained from A and B.

As the pulse width of the PWM control signal is adjusted to allow the output line voltage to be the same before and after the shift, the output line voltage may be the same before and after the shift. That is, according to such control, there is no change in the voltage to the motor. Therefore, the voltage of the motor drive may not change.

FIG. 4C is diagram illustrating a specification for generating a transformed waveform in which a pulse shift is performed in a three-phase modulation wave according to an embodiment of the disclosure.

Referring to FIG. 4C, according to an embodiment, the pulse shifter 250 may shift the PWM control signal to prevent two phases of the PWM control signal from being turned on simultaneously in one cycle of the carrier, that is the pulse shifter 250 may shift the PWM control signal to allow the falling edge of the PWM control signal of the phase having the maximum magnitude-voltage command signal and a rising edge of the PWM control signal of the phase having the second maximum magnitude-voltage command signal to be adjacent to each other, and to allow a falling edge of the PWM control signal of the phase having the second maximum magnitude-voltage command signal and a rising edge of the PWM control signal of the phase having the minimum magnitude-voltage command signal to be adjacent to each other. An example of this pulse shift is the conversion from the plot 410 to the plot 430.

According to another embodiment, the pulse shift is performed without the zero phase voltage superposition. Therefore, unlike the above-described implementation of the disclosure, the zero phase voltage superposer 220 of the controller 106 is not used. For describing the embodiment, lower-side-stuck two-phase modulation is exemplified, but is not limited thereto. In example 2, upper-side-stuck two-phase modulation may be used.

Figure 5:
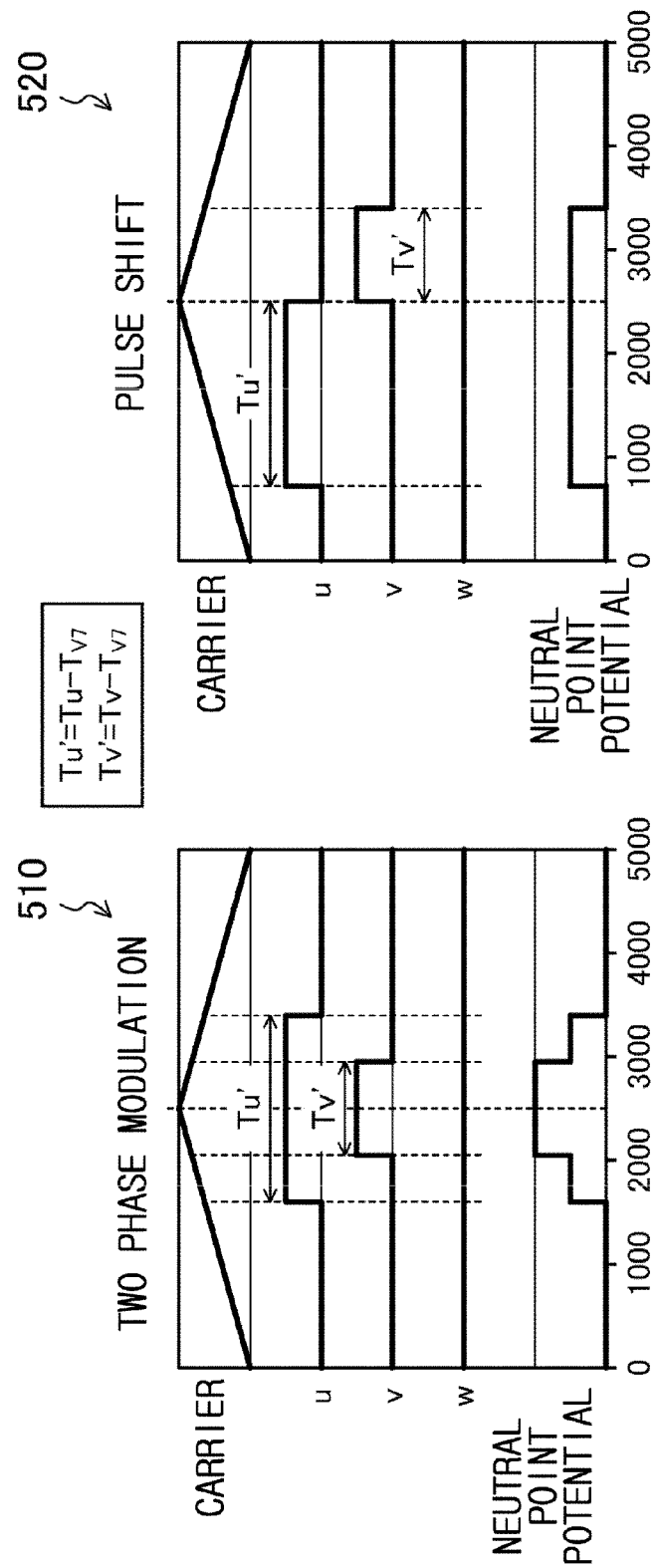
FIG. 5 is a graph illustrating a carrier, a U phase gate signal, a V phase gate signal, a W phase gate signal, and a neutral point potential according to an embodiment of the disclosure.

FIG. 5 is a graph illustrating a carrier, a U phase gate signal, a V phase gate signal, a W phase gate signal, and a neutral point potential according to an embodiment of the disclosure.

Referring to FIG. 5, a plot 510 indicates a waveform of a signal group corresponding to a voltage command signal output from the voltage command signal generator 210. A plot 520 indicates a waveform of a signal group corresponding to the PWM control signal output from the pulse shifter 250.

According to an embodiment, suppression of a sharp change in the neutral point potential, and leakage current reduction (suppressing the variation of the neutral point voltage to one thirds) may be implemented by using two-phase modulation. Particularly, it is possible to obtain a minimum duty for single shunt current sensing at a low modulation rate including zero voltage.

According to an embodiment, a PWM control inverter includes a controller 160 including a voltage command signal generator 210 configured to generate a lower-side-stuck two-phase modulation signal configured to pause one phase among three phases, a carrier generator 230 configured to generate a carrier of a triangular wave that is sufficiently higher than a voltage command signal, and a comparator 240 configured to generate a PWM control signal for driving a main circuit 101 by comparing a magnitude of the voltage command signal with a magnitude of the carrier. The PWM control inverter includes a pulse shifter 250 configured to shift a PWM control signal in one cycle of a carrier.

According to an embodiment, it is possible to suppress the variation of the neutral point potential to Vdc/3 and at the same time to reduce a pulse width using the lower-side-stuck two-phase modulation as the modulation method. Particularly, each pulse is shifted to allow a falling (or rising) edge of a pulse output of a phase having the maximum modulation rate and a rising (or falling) edge of a pulse output of a phase having the middle modulation rate to be adjacent to each other. Therefore, it is possible to compensate the leakage current having opposite polarity, thereby reducing the leakage current caused by switching which corresponds to one phase switching apparently, and thus it is possible to suppress the variation of the neutral point potential to Vdc/3 despite of using the two phase modulation method. Further, when a pulse width is set on the premise of securing the minimum on-period for single shunt current sensing, it may be applied to single shunt current sensing system (for example, a refrigerator, and an air conditioner). Therefore, example 2 may also be implemented in combination with example 1, and thus it may be used for decimation control of current control.

FIG. 6A is diagram illustrating a specification for generating a transformed waveform in which a pulse shift is performed in a three-phase modulation wave according to an embodiment of the disclosure. In the pulse shift, the value of the voltage command signal compared with the triangular wave carrier is adjusted by the rising and falling of the triangular wave.

Referring to FIG. 6A, a vertical axis represents a voltage ranging from −Vdc/2 to +Vdc/2, and a horizontal axis represents a time corresponding to one cycle of the carrier. Referring to FIG. 6A, "Max" represents a phase (U phase), in which a magnitude of the voltage command signal is the maximum, and "Mid" represents a phase (V phase), in which a magnitude of the voltage command signal is the second maximum.

"Min" represents a phase (W phase), in which a magnitude of the voltage command signal is the minimum.

Referring to FIG. 6A, "Au" represents a state of an upper switching element on the U phase, "Ad" represents a state of the lower switching element on the U phase, "Bu" represents a state of the upper switching element on the V phase, and "Bd" represents a state of the lower switching element on the V phase.

"Cu" represents a state of the upper switching element on the W phase, and "Cd" represents a state of the lower switching element on the W phase. A horizontal portion in which the plots of Max, Mid, and Min in FIG. 6A are cut off from the carrier represents a section in which the switching elements of each phase are turned on.

Figure 6B:
FIG. 6B is diagram illustrating a specification for generating a transformed waveform in which a pulse shift is performed in a three-phase modulation wave according to an embodiment of the disclosure.

FIG. 6B is a table illustrating line voltages with a period A and B of FIG. 6A according to an embodiment of the disclosure.

Referring to FIG. 6B, a line voltage Max→Mid is a voltage between the UV phases, a line voltage Max→Min is a voltage between the UW phases, and a line voltage Mid→Min is the voltage between the VW phases.

In order to prevent two phases, which are not paused, from being simultaneously turned on in one cycle of the carrier, the pulse shifter 250 may shift a PWM control signal to allow a falling edge of a PWM control signal of the phase having the maximum magnitude-voltage command signal and a rising edge of a PWM control signal of the phase having the minimum magnitude-voltage command signal to be adjacent to each other, or to allow a rising edge of a PWM control signal of the phase having the maximum magnitude-voltage command signal and a falling edge of a PWM control signal of the phase having the minimum magnitude-voltage command signal to be adjacent to each other. An example of this pulse shift is the conversion from a plot 610 to a plot 620.

The pulse shifter 250 adjusts a pulse width of the PWM control signal to allow an output line voltage to be the same before and after the shift (between the plot 610 and the plot 620). In order to implement this, it is required that the output line voltages according to one cycle of the carrier are the same between the plot 610 and the plot 620. The output line voltages according to one cycle of the carrier of the 610 510 and the plot 620 may be represented by relationship 615 and relationship 625, respectively. When it is assumed that C is constant, D and E may be obtained from A and B.

Figure 7:
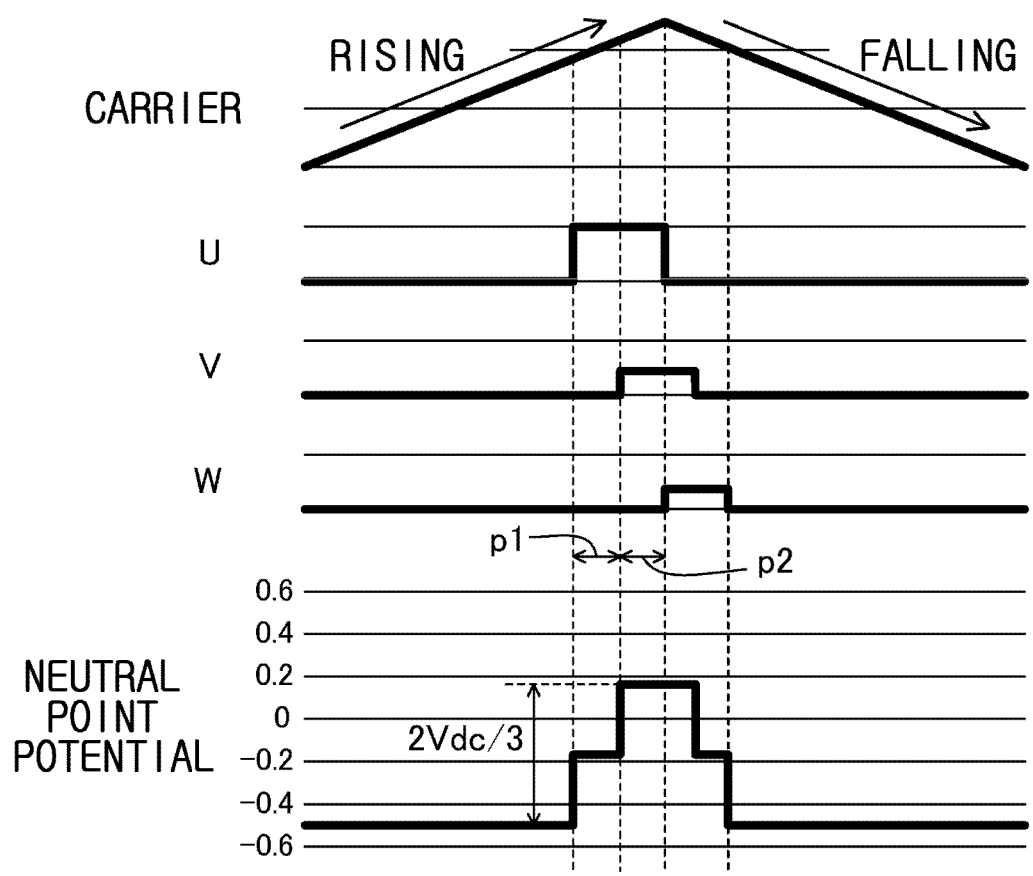
FIG. 7 is a view illustrating a pulse width modulation (PWM) control signal appropriate when applying a single shunt current sensing according to an embodiment of the disclosure.

FIG. 7 is a view illustrating a PWM control signal appropriate when applying a single shunt current sensing in example 1 according to an embodiment of the disclosure.

Referring to FIG. 7, "p1" represents a period in which a PWM control signal of the phase (for example, U phase) having the maximum magnitude-voltage command signal among three phases is turned on and a PWM control signal of the phase (for example, V phase) having the second maximum magnitude-voltage command signal and a PWM control signal of the phase (for example, W phase) having the minimum magnitude-voltage command signal are turned off. "p2" represents a period in which the PWM control signal of the phase (for example, U phase) having the maximum magnitude-voltage command signal and the PWM control signal of the phase (for example, V phase) having the second maximum magnitude-voltage command signal are turned on and the PWM control signal of the phase (for example, W phase) having the minimum magnitude-voltage command signal is turned off. When applying single shunt current sensing in example 1, it is appropriate that the period p1 and p2 become longer than a predetermined minimum period required for single shunt current sensing. Therefore, when applying the single shunt current sensing in example 1, the zero phase voltage superposer 220 may superpose the zero phase voltage and the pulse shifter 250 may adjust a pulse shift amount to satisfy the relationship. Therefore, it is possible to secure the lowest duty (for example, the constant C part of FIG. 4A) required for the current sensing.

Figure 8:
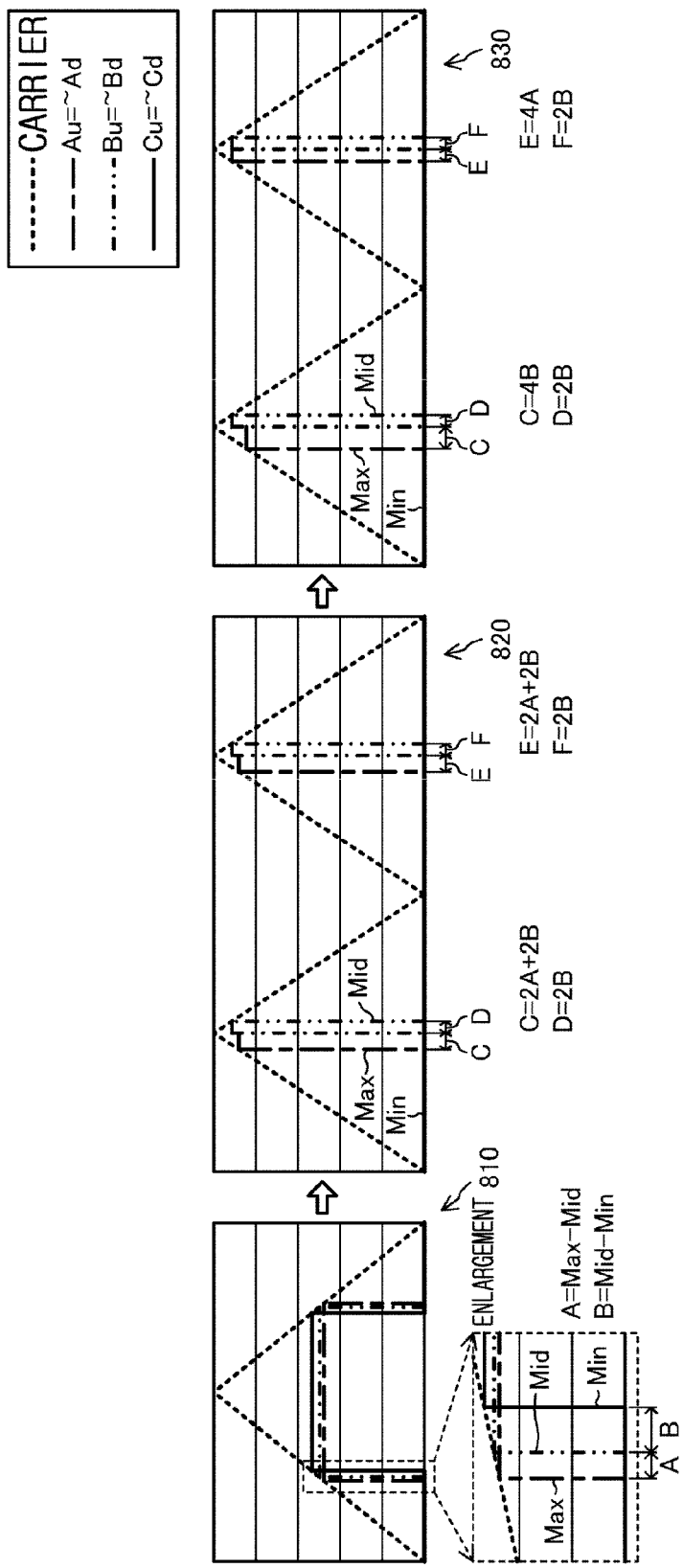
FIG. 8 is a view illustrating an example of changing duty in a consecutive plurality of cycles of carrier according to an embodiment of the disclosure.

FIG. 8 is a view illustrating an example of changing duty in a consecutive plurality of cycles of carrier according to an embodiment of the disclosure.

Referring to FIG. 8, a plot 810 is a basic three-phase modulation waveform. A plot 820 is the same voltage output as the plot 810, and is a two-phase modulation waveform having the same duty in two consecutive cycles of the carrier. A plot 830 is the same voltage output as the plot 810, and is a two-phase modulation waveform with a different duty in two consecutive cycles of the carrier.

According to an embodiment, the pulse shifter 250 adjusts an on-period to prevent the sum of a period in which the PWM control signal of the phase having the maximum magnitude-voltage command signal is turned on and a period in which the PWM control signal of the phase having the second maximum magnitude-voltage command signal is turned on, from being changed in consecutive n cycles (n is an integer of 2 or greater) of the carrier. Particularly, the pulse shifter 250 adjusts the period to provide a relatively long duty and a relatively short duty without changing the sum of the output voltage such as the plot 830. Therefore, in the relatively long duty (a first cycle of the plot 830), it is easy to sense the current. As a result, the chance of current sensing may be increased without changing the average voltage. According to the example of FIG. 8, it is possible to further lower a lower limit of the modulation rate capable of securing the minimum duty required for current sensing in the single shunt system.

According to an embodiment, the controller 106 performs single shunt current sensing, performs the current sensing for each of consecutive n cycles (n is an integer of 2 or greater) of the carrier, and uses an average value of n current values as a value of the current sensing for the control. Therefore, it is possible to improve the accuracy of the current sensing.

According to an embodiment, the pulse shifter 250 omits the shift of the pulse at random. Accordingly, noise may be reduced.

Figure 9:
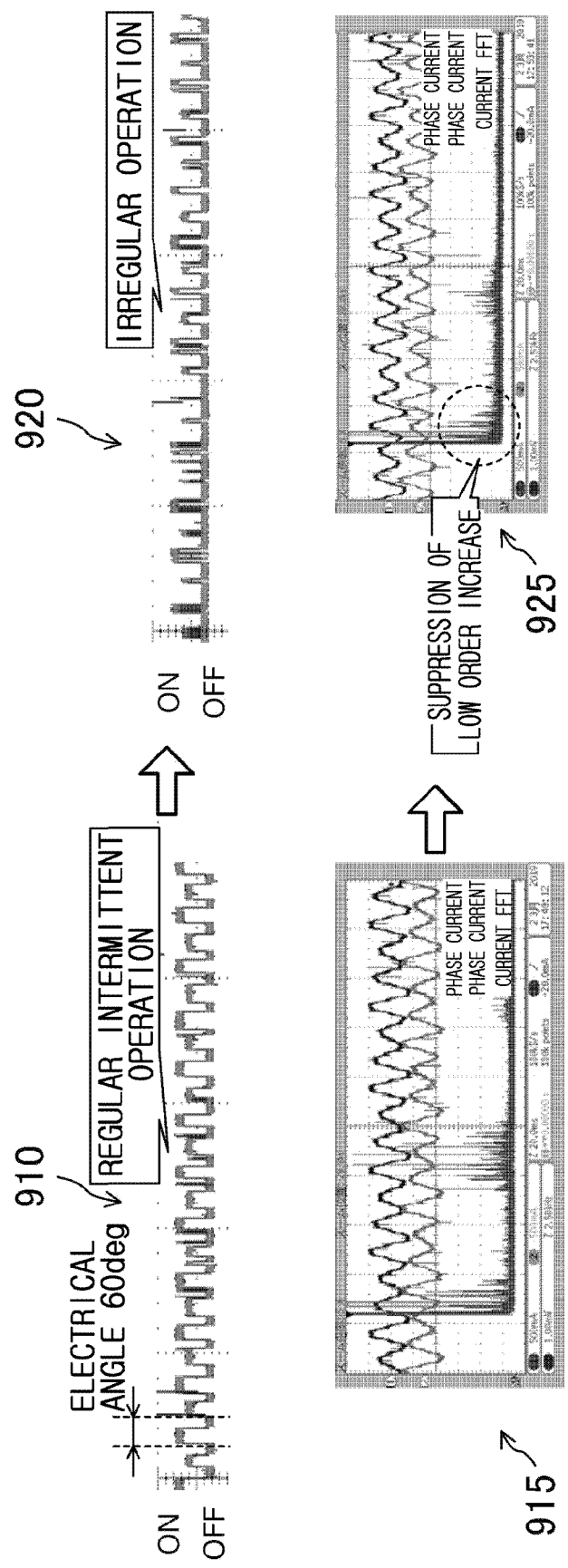
FIG. 9 is a view illustrating occurrence of a shift pulse and a current fast Fourier transform (FFT) according to an embodiment of the disclosure.

FIG. 9 is a view illustrating occurrence of a shift pulse and a current fast Fourier transform (FFT) according to an embodiment of the disclosure.

Referring to FIG. 9, a plot 910 indicates a frequency of pulse shift when the embodiment is not used, and a plot 915 is the current FFT in this case. The plot 910 indicates that the pulse shift is performed at regular intervals, and harmonic component of that (cycle*n times) occurs frequently in the plot 915, which is a low-order harmonic and appears as a current FFT, thereby causing the noise. A plot 920 indicates a frequency of pulse shift when the embodiment is used, and a plot 925 is the current FFT in this case. In the plot 920, the pulse shift is omitted at random. Due to the random omission, the above mentioned low-order harmonic does not occur. That is, noise may be reduced by controlling the pulse shift to occur irregularly.

According to an embodiment, the example 1 (three phase control) may be performed in response to the small modulation rate, and the example 2 (two phase control) may be performed in response to the great modulation rate. In a case in which a pulse width after the pulse shift becomes a value smaller than the minimum duty of current sensing, it is difficult for the example 2 to perform accurate current sensing, and thus the example 2 may be not effective for this case. "Effective" means that a case in which a current is not sensed for each cycle of the carrier in the shifted pulse. Although decimation may be performed in the current sensing itself, but it is not appropriate. However, in the configuration of the example 1, it is possible to secure the minimum duty for the current sensing even at a significantly small duty. Therefore, it is appropriate to convert between the control of the example 1 and the control of the example 2 based on the modulation rate. For example, in response to the modulation rate of greater than 50%, the pulse shift is not performed (neither embodiment 1 nor embodiment 2 is performed). In response to the modulation rate of from 10 to 50%, the pulse shift of the example 2 is performed. In response to the modulation rate of less than 10%, the pulse shift of the example 1 is performed. In this configuration, by combining the control of the example 1 configured to perform the current sensing and the control of the example 2 configured to reduce leakage current, it is possible to reliably perform the current sensing and to minimize the leakage current.

According to an embodiment, the control of the example 1 configured to perform the current sensing is combined with the control of the two phase modulation of the related art. Particularly, in response to the omission of the pulse shift, the voltage command signal generator 210 generates a lower-side-stuck two-phase modulation signal or an upper-side-stuck two-phase modulation signal configured to pause one phase among three phases. In response to the use of the two-phase modulation waveform of the related art, which is performed only when the current sensing is not performed due to the small modulation rate, the current ripple is reduced. By combining the example 1 and the two-phase modulation of the related art, it is possible to obtain the reduction of the leakage current and the improvement of the control stability.

According to an embodiment, the pulse shifter 250 shifts the PWM control signal in response to a modulation rate being less than a certain modulation rate. Particularly, when the modulation rates such as positioning and forced current are small, the example 1 and the example 2 and the modulation method according to the modified example thereof may be used. The leakage current tends to increase when three-phase modulation or two-phase modulation of the related art is used in response to the small modulation rate. However, in this case, leakage current may be reduced by using various examples according to the disclosure. In addition, by reducing the pulse width, the noise component may be moved toward the harmonic, thereby reducing the noise of the carrier fundamental component. Therefore, noise during positioning may be reduced. In response to from the medium modulation rate to the great modulation rate, two-phase modulation or three-phase modulation may generally be used because the effect on noise is small.

Figure 10:
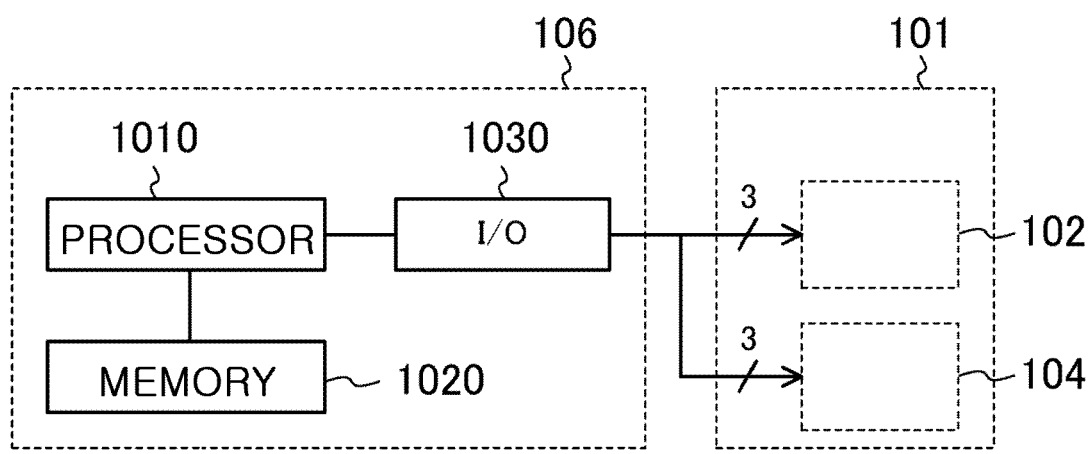
FIG. 10 is a block diagram illustrating a structure of a controller according to an embodiment of the disclosure.

FIG. 10 is a block diagram illustrating a structure of a controller according to an embodiment of the disclosure.

Referring to FIG. 10, the controller 106 includes at least one processor 1010, a memory 1020, and an input/outputter 1030. The processor 1010 generates a voltage command signal and a carrier, generates a PWM control signal based on comparison between the voltage command signal and the carrier, and outputs the PWM control signal to the switching elements 102a to 102c and 104a to 104c of the main circuit 101, respectively. The memory 1020 stores instructions and parameters used in processing executed by the processor 1010. The input/outputter 1030 generates a control signal based on the output of the processor 1010 and outputs the control signal to the upper arm 102 and the lower arm 104 of the main circuit 101. The input/outputter 1030 may be included in the processor 1010.

FIGS. 11, 12, 13 and 14 are flow charts according to various embodiments of the disclosure.

Figure 11:
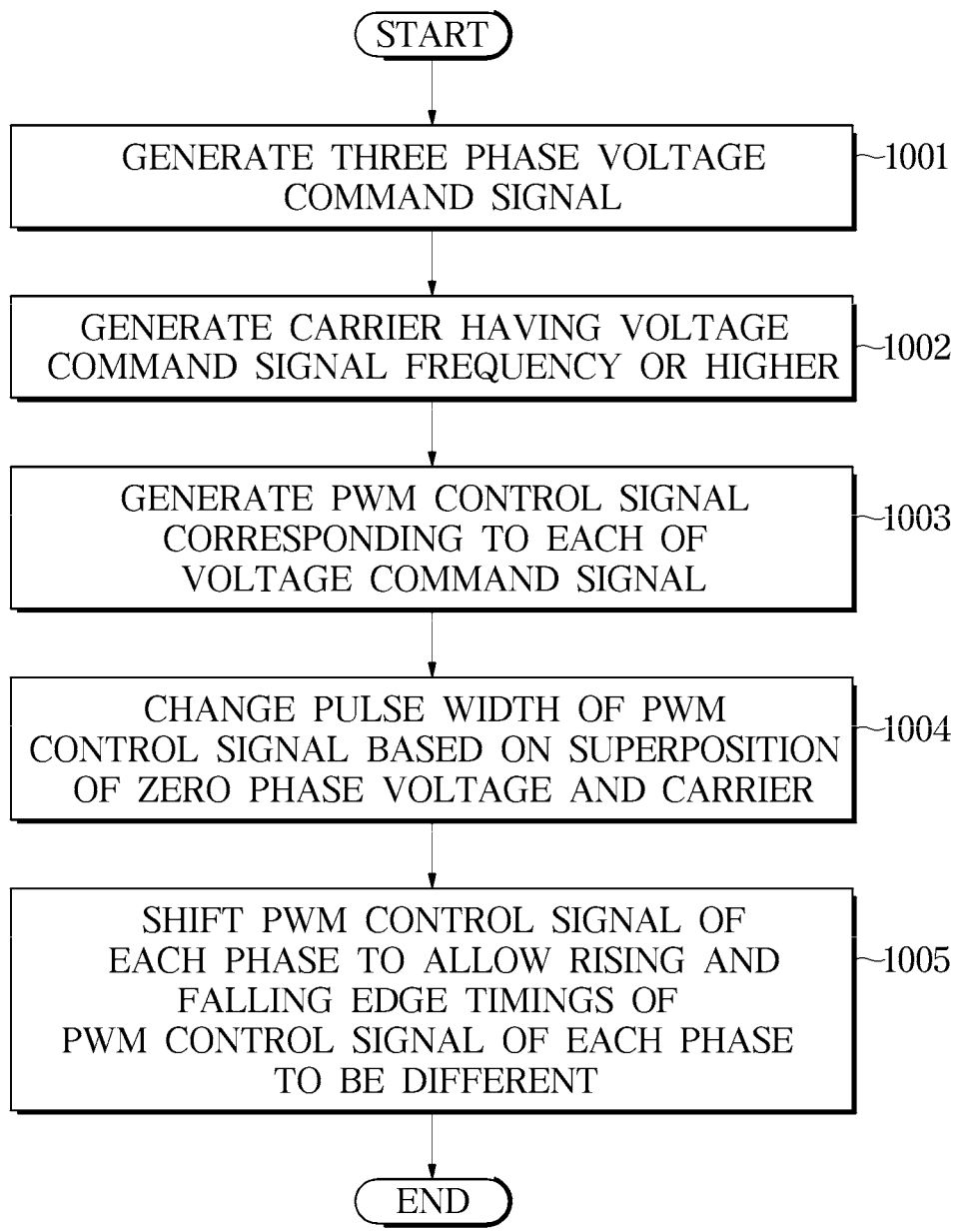
FIG. 11 is a flow chart according to an embodiment of the disclosure.

Referring to FIG. 11, the voltage signal generator may generate a three-phase voltage command signal at operation 1001.

In addition, the carrier generator may generate a carrier having a voltage command signal frequency or higher at operation 1002. Based on this, the at least one processor may generate a PWM control signal corresponding to each of the voltage command signals at operation 1003.

Further, the at least one processor may change a pulse width of the PWM control signal based on the superposition of the zero phase voltage and the carrier at operation 1004.

The at least one processor may shift the PWM control signal of each phase to allow the rising and falling edge timings of the PWM control signals of each phase to be different at operation 1005.

Figure 12:
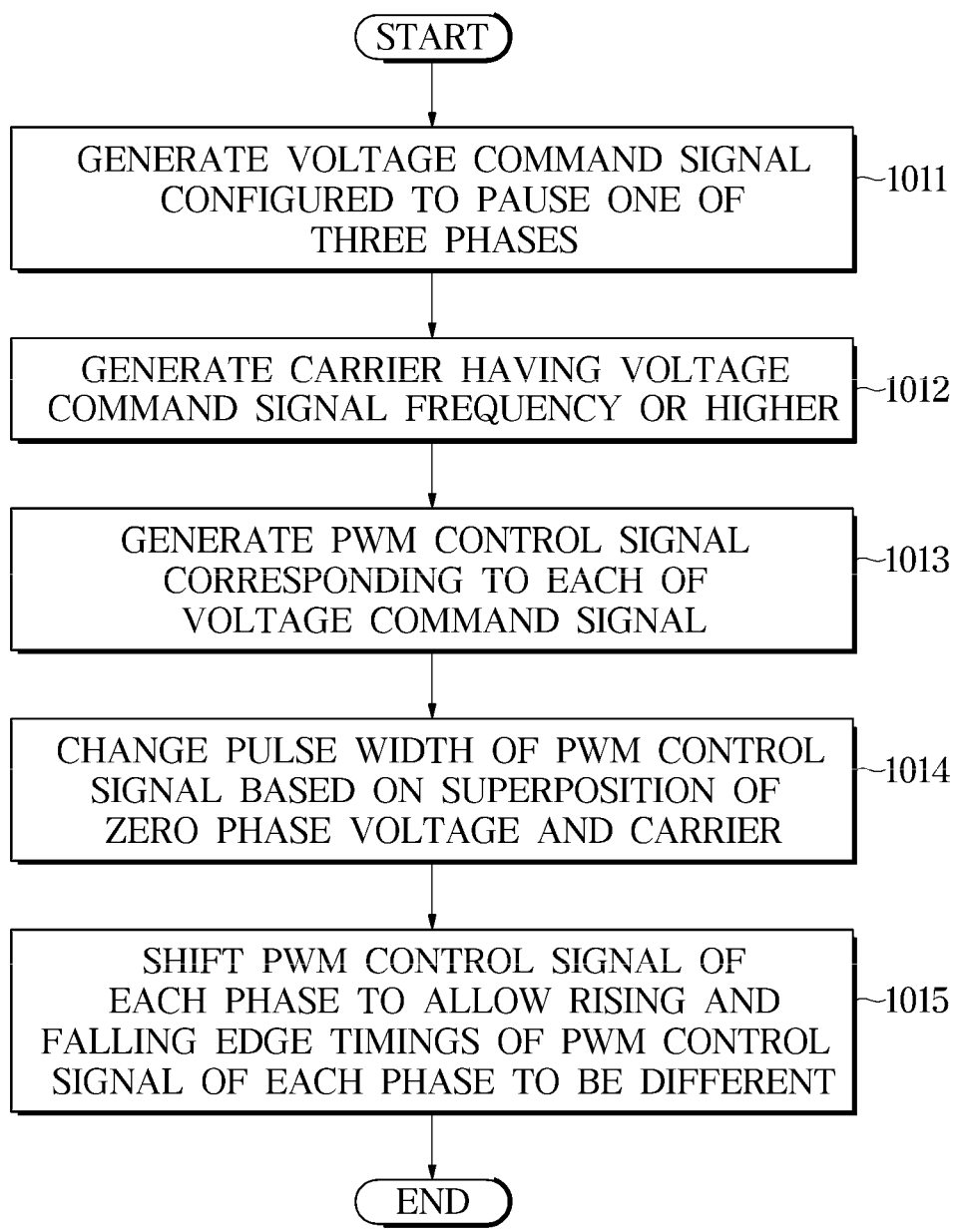
FIG. 12 is a flow chart according to an embodiment of the disclosure.

FIG. 12 illustrates an operation of the disclosure, which is operated based on two phases according to an embodiment of the disclosure.

Referring to FIG. 12, the voltage signal generator may generate a voltage command signal configured to pause one of three phases at operation 1011.

Further, the carrier generator may generate a carrier having a voltage command signal frequency or higher at operation 1012. Based on this, the at least one processor may generate a PWM control signal corresponding to each of the voltage command signals at operation 1013.

In addition, the at least one processor may change the PWM control signal pulse width based on the superposition of the zero phase voltage and the carrier at operation 1014.

The at least one processor may shift the PWM control signal of each phase to allow the rising and falling edge timings of the PWM control signals of each phase to be different at operation 1015.

Figure 13:
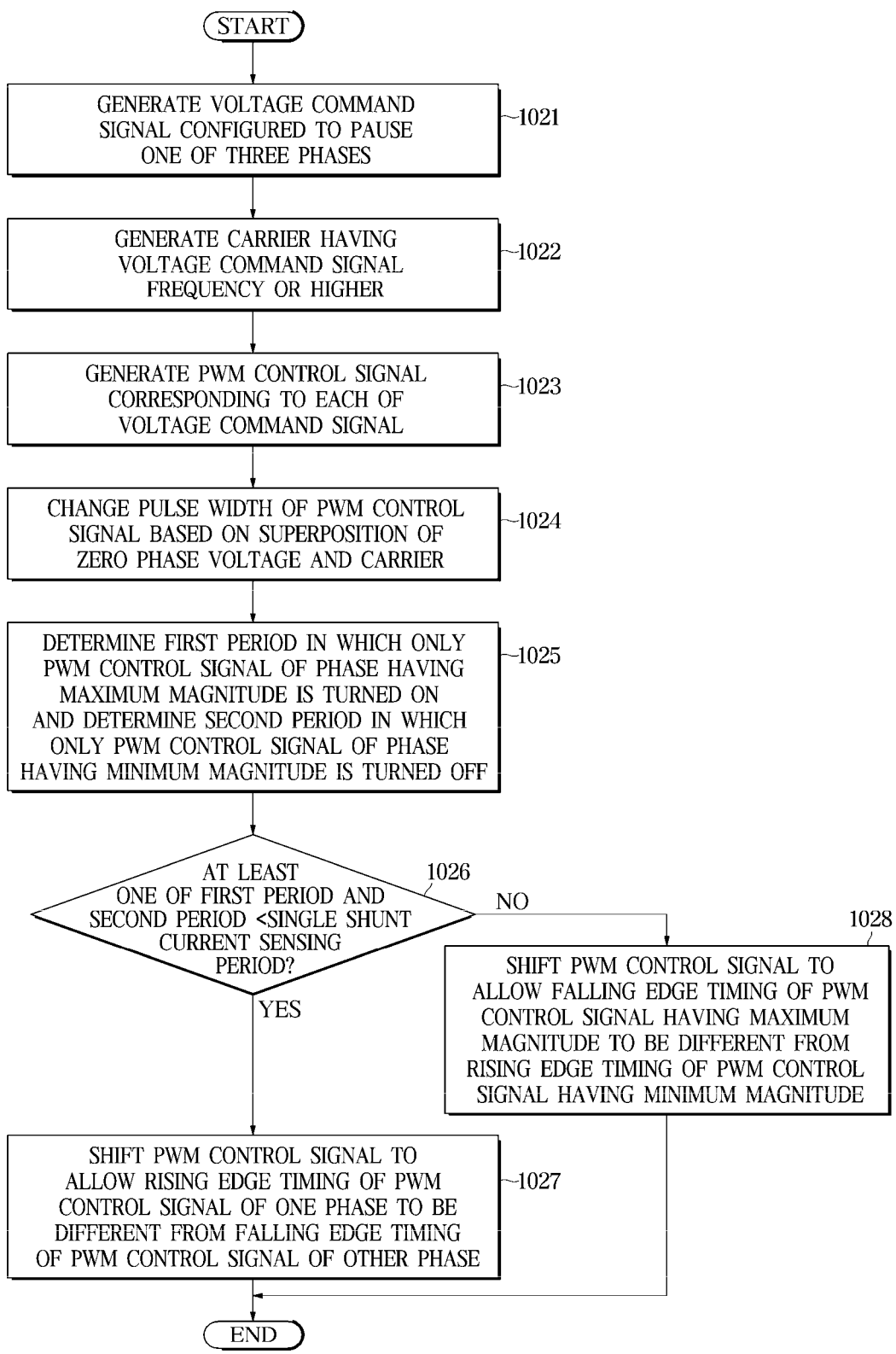
FIG. 13 is a flow chart according to an embodiment of the disclosure.
Figure 14:
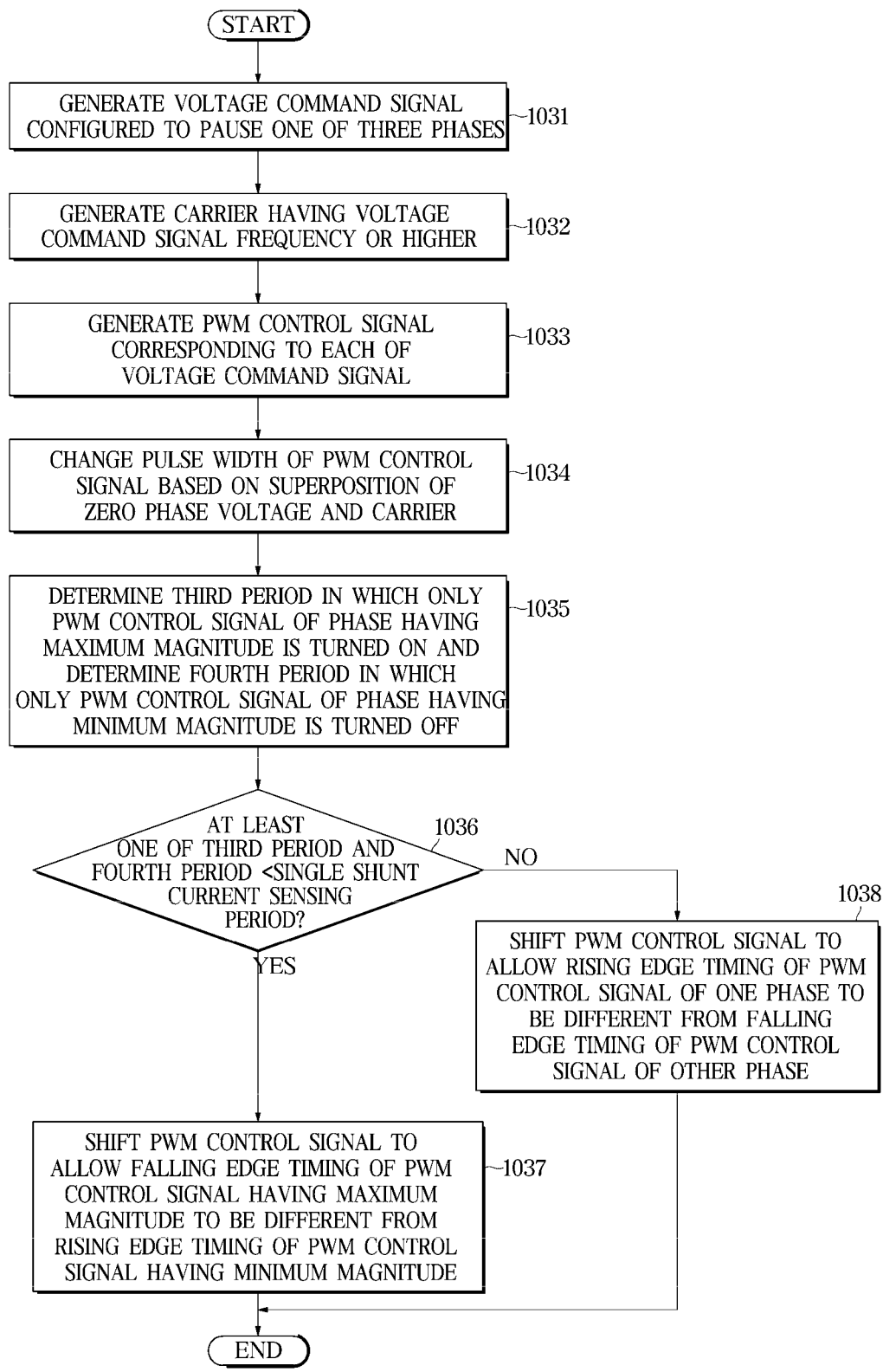
FIG. 14 is a flow chart according to an embodiment of the disclosure.

FIGS. 13 and 14 are flowcharts illustrating an operation of shifting a PWM control signal based on a single shunt sensing period according to various embodiments of the disclosure.

Referring to FIG. 13, the voltage signal generator may generate a voltage command signal configured to pause one of three phases at operation 1021.

Further, the carrier generator may generate a carrier having a voltage command signal frequency or higher at operation 1022. Based on this, the at least one processor may generate a PWM control signal corresponding to each of the voltage command signals at operation 1023.

In addition, the at least one processor may change the PWM control signal pulse width based on the superposition of the zero phase voltage and the carrier at operation 1024.

On the other hand, the at least one processor may determine a first period in which only the PWM control signal of the phase having the maximum magnitude among the three phases is turned on and the PWM signal of the other phase is turned off. In addition, the at least one processor may determine a second period in which only the PWM control signal of the phase having the minimum magnitude among the three phases is turned off and the PWM signal of the other phase is turned off at operation 1025.

Meanwhile, in response to at least one of the first period and the second period being less than single shunt current sensing period at operation 1026, the at least one processor may shift the PWM control signal to allow the rising edge timing of the PWM control signal of one phase to be different from the falling edge timing of the PWM control signal of other phase at operation 1027.

In response to at least one of the first period and the second period being less than single shunt current sensing period at operation 1026, the at least one processor may shift the PWM control signal to allow the falling edge timing of the PWM control signal having the maximum magnitude to be different from the rising edge timing of the PWM control signal having the minimum magnitude at operation 1028.

Referring to FIG. 14, the voltage signal generator may generate a voltage command signal configured to pause one of three phases at operation 1031.

Further, the carrier generator may generate a carrier having a voltage command signal frequency or higher at operation 1032. Based on this, the at least one processor may generate a PWM control signal corresponding to each of the voltage command signals at operation 1033.

In addition, the at least one processor may change the PWM control signal pulse width based on the superposition of the zero phase voltage and the carrier at operation 1034.

On the other hand, the at least one processor may determine a third period in which only the PWM control signal of the phase having the maximum magnitude among the three phases is turned on and the PWM signal of the other phase is turned off. In addition, the at least one processor may determine a fourth period in which only the PWM control signal of the phase having the minimum magnitude among the three phases is turned off and the PWM signal of the other phase is turned off at operation 1035.

Meanwhile, in response to at least one of the third period and the fourth period being greater than single shunt current sensing period at operation 1036, the at least one processor may shift the PWM control signal to allow the falling edge timing of the PWM control signal having the maximum magnitude to be different from the rising edge timing of the PWM control signal having the minimum magnitude at operation 1037.

In response to at least one of the third period and the fourth period being less than single shunt current sensing period at operation 1036, the at least one processor may shift the PWM control signal to allow the rising edge timing of the PWM control signal of one phase to be different from the falling edge timing of the PWM control signal of other phase at operation 1038.

As is apparent from the above description, the inverter and the control method thereof may efficiently reduce leakage current and noise in various environments by shifting a pulse signal of an inverter controlling a three-phase drive motor.

The various functions of the disclosure may be implemented with a single element or multiple elements, respectively. Conversely, multiple functions may be implemented as a single element. Each function may be implemented by hardware, software, or a combination of hardware and software. The flow of the disclosure includes a plurality of blocks. The processing of these blocks may be performed in series or in parallel. Also, the order of some blocks may be changed.

The subject of the apparatus, system or method of the disclosure is equipped with a computer. When this computer executes the program, the functions of the apparatus, system or method subject of the disclosure are implemented. The computer has a processor that operates according to a program as a main hardware configuration. As long as the processor implements the function by executing the program, any type of processor may be used. The processor is provided with one electronic circuit or a plurality of electronic circuits including a semiconductor integrated circuit (IC) or large scale integration (LSI). Although referred to herein as IC or LSI, names thereof may change according to the degree of integration, and thus these may be referred to as a system LSI, very large scale integration (VLSI), or ultra large scale integration (ULSI). A field programmable gate array (FPGA) that is programed after manufacturing of the LSI or a reconfigurable logic device capable of reconfiguring LSI internal junction or capable of setting up LSI internal circuit blocks may be used for the same purpose. The plurality of electronic circuits may be integrated on one chip or provided on a plurality of chips. The plurality of chips may be integrated in one device or may be provided in a plurality of devices. The program is recorded on a non-transitory recording medium such as a computer readable ROM, optical disc, hard disk drive, and the like. The program may be pre-stored in the recording medium or may be supplied to the recording medium through a wide area network including the Internet.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An apparatus comprising:
   at least one compressor configured to circulate refrigerant,
   wherein the at least one compressor comprises:
      at least one motor, and
      an inverter configured to supply power to the at least one motor,
   wherein the inverter comprises:
      a plurality of switching elements configured to convert input direct current (DC) power into three-phase alternating current (AC) power and output the three-phase AC power; and
      at least one processor configured to control the plurality of switching elements, and
   wherein the at least one processor is further configured to:
      generate a carrier wave,
      obtain a rising edge timing and a falling edge timing of a pulse width modulation (PWM) control signal of each phase based on superposition of a zero phase voltage having a predetermined magnitude and the carrier wave, and
      drive a motor by shifting the PWM control signal of each phase to allow the rising edge timing and the falling edge timing of a PWM control signal of one phase among the PWM control signal of each phase to be different from the rising edge timing and the falling edge timing of a PWM control signal of other phase among the PWM control signal of the each phase.

2. The apparatus of claim 1, wherein the at least one processor is further configured to shift the PWM control signal to allow two phases of the PWM control signal to be simultaneously turned on within one cycle of the carrier wave.

3. The apparatus of claim 1, wherein the at least one processor is further configured to change a pulse width of the PWM control signal to allow a magnitude of an output line voltage corresponding to the PWM control signal to be substantially the same before and after the shift.

4. The apparatus of claim 1, wherein the at least one processor is further configured to change at least one of the zero phase voltage and a shift amount of the PWM control signal to allow a period, in which the PWM control signal of a phase having a maximum magnitude-voltage command signal among three phases is turned on and the PWM control signal of other phase is turned off, to exceed a predetermined minimum period required for single shunt current sensing.

5. The apparatus of claim 1, wherein the at least one processor is further configured to change at least one of the zero phase voltage and a shift amount of the PWM control signal to allow a period, in which the PWM control signal of a phase having a minimum magnitude-voltage command signal among three phases is turned off and the PWM control signal of other phase is turned on, to exceed a predetermined minimum period required for single shunt current sensing.

6. The apparatus of claim 1, wherein the at least one processor is further configured to stop the shift at any point of time.

7. The apparatus of claim 6, wherein the at least one processor is further configured to generate a lower-side-stuck two-phase modulation signal or an upper-side-stuck two-phase modulation signal configured to pause one phase among three phases in response to the stop of the shift.

8. The apparatus of claim 1, wherein the at least one processor is further configured to shift the PWM control signal in response to the three-phase AC power being less than a predetermined modulation rate.

9. The apparatus of claim 1,
wherein the at least one processor is further configured to pause one phase of three phases by generating a lower-side-stuck two-phase modulation signal by controlling the plurality of switching elements, and
wherein the at least one processor is further configured to shift a PWM control signal of each phase to allow the rising edge timing and the falling edge timing of the PWM control signal of one phase among the PWM control signal corresponding to the lower-side-stuck two-phase modulation signal to be different from the rising edge timing and the falling edge timing of the PWM control signal of other phase.

10. The apparatus of claim 9, wherein the at least one processor is further configured to adjust an on-period to allow a sum of periods, in which the PWM control signal corresponding to each phase is turned on, to be substantially the same in a plurality of consecutive cycles of the carrier wave.

11. A control method of an apparatus comprising:
generating a carrier wave;
converting input direct current (DC) power into three-phase alternating current (AC) power and output the three-phase AC power;
obtaining a rising edge timing and a falling edge timing of a pulse width modulation (PWM) control signal of each phase based on superposition of a zero phase voltage having a predetermined magnitude and the carrier wave;
shifting the PWM control signal of each phase to allow the rising edge timing and the falling edge timing of a PWM control signal of one phase among the PWM control signal of the each phase to be different from the rising edge timing and the falling edge timing of a PWM control signal of other phase among the PWM control signal of the each phase;
outputting the three-phase AC power; and
driving a motor by the three-phase AC power.

12. The control method of claim 11, wherein the shifting of the PWM control signal of each phase comprises shifting the PWM control signal to allow two phases of the PWM control signal to be simultaneously turned on within one cycle of the carrier wave.

13. The control method of claim 11, further comprising:
changing a pulse width of the PWM control signal to allow a magnitude of an output line voltage corresponding to the PWM control signal to be substantially the same before and after the shift.

14. The control method of claim 11, wherein the shifting of the PWM control signal of each phase comprises changing at least one of the zero phase voltage and a shift amount of the PWM control signal to allow a period, in which the PWM control signal of a phase having a maximum magnitude-voltage command signal among three phases is turned on and the PWM control signal of other phase is turned off, to exceed a predetermined minimum period required for single shunt current sensing.

15. The control method of claim 11, wherein the shifting of the PWM control signal of each phase comprises changing at least one of the zero phase voltage and a shift amount of the PWM control signal to allow a period, in which the PWM control signal of a phase having a minimum magnitude-voltage command signal among three phases is turned off and the PWM control signal of other phase is turned on, to exceed a predetermined minimum period required for single shunt current sensing.

16. The control method of claim 11, further comprising:
stopping the shift at any point of time.

17. The control method of claim 16, further comprising:
generating a lower-side-stuck two-phase modulation signal or an upper-side-stuck two-phase modulation signal configured to pause one phase among three phases in response to the stop of the shift.

18. The control method of claim 11, wherein the shifting of the PWM control signal of each phase comprises shifting the PWM control signal in response to a three-phase alternating current (AC) power being less than a predetermined modulation rate.

19. The control method of claim 11, wherein the shifting of the PWM control signal of each phase comprises pausing one phase of three phases by generating a lower-side-stuck two-phase modulation signal by controlling the plurality of switching elements and shifting a PWM control signal of each phase to allow the rising edge timing and the falling edge timing of the PWM control signal of one phase among the PWM control signal corresponding to the lower-side-stuck two-phase modulation signal to be different from the rising edge timing and the falling edge timing of the PWM control signal of other phase.

20. The control method of claim 19, further comprising:
adjusting an on-period to allow a sum of periods, in which the PWM control signal corresponding to each phase is turned on, to be substantially the same in a plurality of consecutive cycles of the carrier wave.

* * * * *